Sept. 9, 1969  R. E. HENNEN  3,466,199
BATTERY WITH IMPROVED VENT
Filed Jan. 3, 1967  3 Sheets-Sheet 1

INVENTOR.
ROY E. HENNEN
BY PENDLETON, NEUMAN
SEIBOLD & WILLIAMS

ATTORNEYS

Sept. 9, 1969         R. E. HENNEN         3,466,199
BATTERY WITH IMPROVED VENT
Filed Jan. 3, 1967                        3 Sheets-Sheet 2
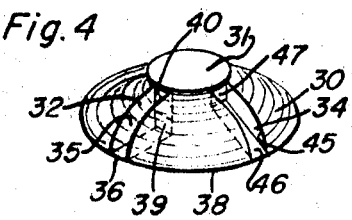
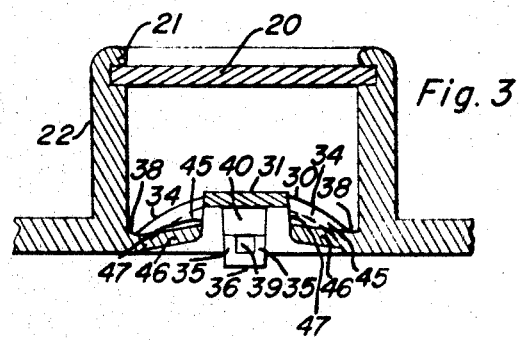
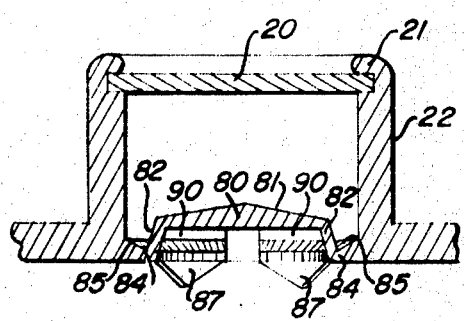
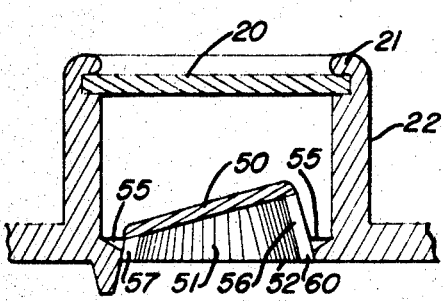
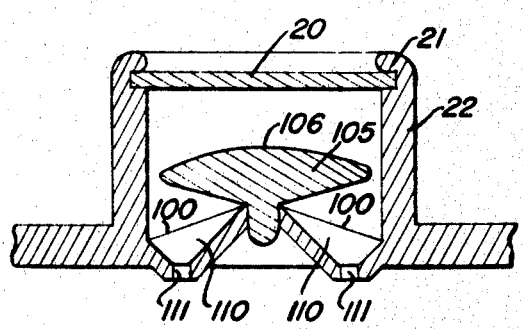
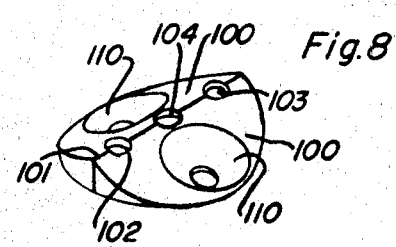
INVENTOR.
ROY E. HENNEN
BY PENDLETON, NEUMAN
SEIBOLD & WILLIAMS
ATTORNEYS

INVENTOR.
ROY E. HENNEN
BY PENDLETON, NEUMAN
SEIBOLD & WILLIAMS

ATTORNEYS

United States Patent Office 3,466,199
Patented Sept. 9, 1969

3,466,199
BATTERY WITH IMPROVED VENT
Roy Erving Hennen, Mequon, Wis., assignor to Globe-Union Inc., Milwaukee, Wis., a corporation of Delaware
Filed Jan. 3, 1967, Ser. No. 606,809
Int. Cl. H01m 1/06
U.S. Cl. 136—177                     2 Claims

ABSTRACT OF THE DISCLOSURE

A battery having a vent including a generally horizontal baffle in the battery cover and nonvertical passageways for venting gas and returning liquid, advantageously used with a microporous disc vent to prevent impairment of the disc's permeability.

---

When a lead acid battery is charged by passing current through it, some of the electrolyte is decomposed into hydrogen and oxygen gases. These gases must be vented from the battery to prevent undesirable pressure buildup and the possibility of explosion. One prior art technique for venting batteries, especially stationary storage batteries, is to place one or more microporous discs in the battery cover. The discs are permeable to gas but not to liquid so the gases are vented with no loss of electrolyte due to splashing, electrolyte spray or liquid entrapment in gas itself. The discs also prevent foreign material from reaching the battery interior. One difficulty experienced with microporous discs is that splashed or condensed vapor electrolyte wets their surfaces and decreases their permeability to a point where they no longer function as efficient vents.

It is therefore an object of the present invention to provide a novel vent for storage batteries.

It is a further object of the present invention to provide an improved vent employing a micrporous material.

It is a further object of the present invention to provide a battery with a novel venting system.

These and other objects are accomplished by providing a novel secondary vent which is positioned between the interior of the battery and a microporous disc. The secondary vent prevents undesirable wetting of the microporous disc, encourages return of any liquid which passes through the secondary vent and prevents gas entrapment within its structure. The secondary vent constructed according to the present invention need not necessarily be used with a microporous disc to secure its advantages. It may be used with other types of primary vents or may be used itself as a primary vent. It is constructed with passageways at both its highest interior portion and lowest exterior portion. The higher passageway prevents gas entrapment while the lower prevents any liquid from remaining on top of the vent. The passageways may be incorporated together in one opening or may be separate. Both passageways are designed with most of their area providing other than a straight line path between the battery interior and the microporous disc to reduce electrolyte splashing on the microporous disc and to encourage condensation of vapor before it reaches the microporous disc. The surfaces of the secondary vent are sloped to encourage liquid or condensed vapor which passes through the secondary vent to return to the battery interior.

A more detailed description of certain preferred embodiments of the present invention will be given with reference to the accompanying drawings in which:

FIG. 3 is a sectional view taken along line 3—3 in FIG. 1.

FIG. 4 is an isometric view of a portion of the vent shown in FIGS. 2 and 3.

FIGS. 5 through 7 are cross sectional views of alternate embodiments of vents constructed according to the present invention.

FIG. 8 is an isometric view showing a portion of the vent shown in FIG. 7.

Figure 1:
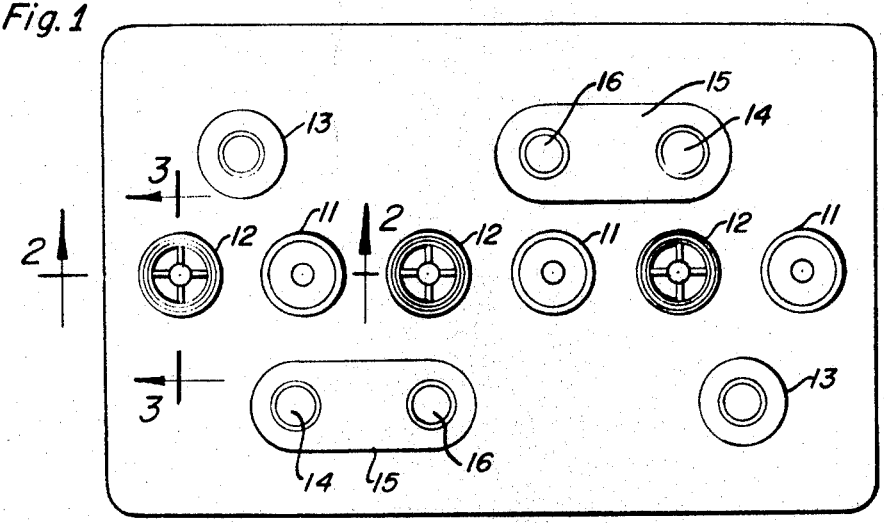
FIG. 1 is a top view of a battery constructed according to the present invention.

The stationary battery shown in FIG. 1 is a six volt battery with three separate cells each having a filling member 11 and a vent 12. The two end cells each include a first terminal post 13 for connection to the external electrical circuit and a second terminal post 14 for electrical connection by a strap 15 to a similar post 16 in the center cell. The battery case and cover are made of hard rubber, plastic, or other material conventionally used in the battery art. The construction of the filling member 11 and vent 12 is illustrated in greater detail in FIG. 2.

The filling member 11 shown is conventional; it includes a funnel portion 16 and an extension 17. Typically, the electrolyte level within the storage battery rises above the lowest portion 18 of the extension 17. The filling member 11 may be capped to eliminate splashing, but this is by means necessary for most applications. It is convenient to cap the member 11 during shipment.

Figure 2:
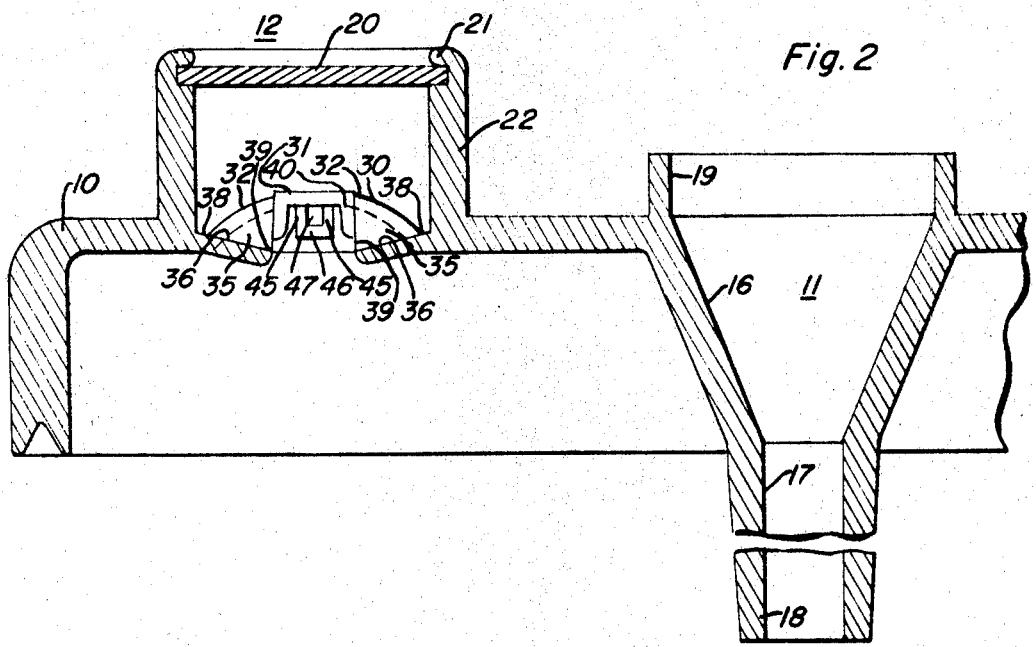
FIG. 2 is a partial cross sectional view of the battery shown in FIG. 1 taken along line 2—2 in FIG. 1.

In all lead acid storage batteries it is necessary to provide some means for enabling gases formed in charging the battery to be vented from the interior of the battery case. Otherwise, undesirable pressure can build up within the battery and cause explosion. One embodiment of a vent constructed according to the present invention, as illustrated in FIG. 2, includes a gas permeable microporous disc 20 supported by a shoulder 21 in a cylindrical structure 22 extending from the battery cover 10 and secured by roll forming the top lip of structure 22 in over the disc 20. A suitable microporous disc for present purposes is a plastic sheet produced from high density polyethylene powder (50 micron particle size) by sintering. The permeability of the sheet may be, for example, on the order of 100–500 cubic feet per minute per square foot at 8 inches water gauge pressure. The microporous disc 20 is the primary vent of the present construction.

Positioned between the microporous disc and the interior of the battery is a secondary venting arrangement. Two other views of the secondary venting arrangement are shown in FIGS. 3 and 4. The vent includes a dome shaped baffle 30 formed with a flat top portion 31 near the microporous disc 20. The baffle 30 has four indented portions 32, 34 formed in the dome. A first two indented portions 32 have side walls 35 which extend vertically to a bottom wall 36 which slants into the interior of the battery from the edge 38 of the baffle 30. At the lowest portion of the walls 36, passageways or holes 39 are formed in walls 40 extending from the top portion 31. The second two indented portions 34 have attached side walls 45 extending vertically to bottom walls 46 which slant away from the interior of the battery from the lower edge 38 of the baffle 30. At the highest portion of the bottom walls 46, passageway 47 are formed adjacent the top portion 31.

The principal function of the secondary venting arrangement is to enable gas to pass through the microporous disc 20 while preventing electrolyte from splashing or condensing on the disc 20. The essentially vertical disposition of the only liquid passageways 39, 47 minimizes the chance that any liquid will splash onto the disc 20 from the battery interior because little or no liquid can leave the interior in the direction of the disc 20. The sloping walls 35, 36, 45, 46 near the passageways 39, 47, as well as the dome 30, encourage the return of any liquid which passes through the holes 39, 47.

Most electrolyte vapor condenses on the underside of the baffle 30, but if any does pass through the holes 39, 47 most condenses on one of the walls 35, 36, 45, 46 adjacent the passageways 39, 47. This is due to the essentially vertical disposition of the passages 39, 47 which prevent most vapor from traveling in a straight line path between the battery interior and the disc 20.

It has been found that the passageways in the vent need not eliminate all straight line paths between the battery interior and the disc 20 in order to be effective. However, at least a major portion of the passageway should not provide a straight line path.

The vent construction also minimizes gas entrapment because the second two passages 47 are positioned at the uppermost portion of the interior of the vent.

FIG. 5 is a cross sectional view of a second embodiment of a vent constructed according to the present invention. Here a baffle 50, which is relatively flat and sloping with respect to horizontal, is positioned between the microporous disc 20 and the interior of the battery. The baffle 50 is supported by a slanting wall 51 attached to the lowest portion 52 of the vent. A sloping surface 55 surrounds the wall 51. The supporting wall 51 has a first vertically elongated hole 56 extending from the highest portion of the baffle 50 to the low edge 52 of the wall 51 and a second hole 57 near the low edge 52 of the wall 51.

In this embodiment of the invention the bottom portion 60 of the first passageway 56 as well as the second passageway 57 near the lowest portion of the baffle provides passages for liquid to return to the interior of the battery. The upper portion of the first passageway 56 provides a gas venting function. In normal operation, of course, both passageways 56, 57 serve as gas venting passages. But if the passageway 57 should be unable to vent due to returning liquid, the upper portion of the passageway 56 will always provide a gas vent. As in the previous embodiment, the major portions of the passageways 56, 57 are disposed to prevent a straight line path between the battery interior and the disc 20. The sloping surface 55 which surrounds the wall 51, as well as the sloped configuration of both the wall 51 and baffle 50, supporting structure of the baffle, encourages return of the liquid of the interior of the battery.

In the embodiment of the invention shown in FIG. 6 a baffle 80 having a conically shaped surface 81 is positioned between the interior of the battery and the microporous disc 20. The baffle 80 is supported by four legs 82, which connect the baffle 80 to the side 84 of the vent. (Only three legs are shown due to the sectional view.) All four of the legs 82, slope to encourage liquid drainage. Also, a sloping surface 85 is provided around the vent to encourage drainage and four vertical triangular projections 87 are provided for the same reason.

This embodiment of the present invention differs from those shown in FIGS. 2 through 5 in that each of the passageways 90 formed between the four supporting legs 82, serves primarily as both a gas venting passage and a liquid return passage. The liquid return function is, of course, performed primarily by the lower portion of each of the four passages 82 while the venting function is performed by the entire passageway.

The embodiment of the invention shown in FIGS. 7 and 8 has the advantage of being relatively easy to mold This embodiment includes generally two sloping surfaces 100 which meet at a line 101 joining the points on these surfaces nearest the microporous disc 20. Three holes 102, 103, 104 intersect the line 101 joining the two surfaces 100. The two end holes 102, 103 provide the gas venting function while the center hole 104 supports a baffle 105 positioned above the two surfaces 100. Each of the two sloping surfaces 100 includes an indented surface 110 which extends into the interior of the battery. At the bottom of each indented surface 110 a hole 111 is provided for liquid drainage. Here the baffle 105 prevents a straight line path between the battery interior and the disc 20.

This embodiment is relatively easy to mold since all of the holes are positioned on parallel vertical axes. The baffle 105 is snapped into the center hole 104 after the molding process. In this embodiment, both the two sloping surfaces 100 as well as the two indented surfaces 110 encourage return of liquid. Also, the baffle member 105 is provided with a dome shaped top portion 106 to encourage drainage.

Figure 9:
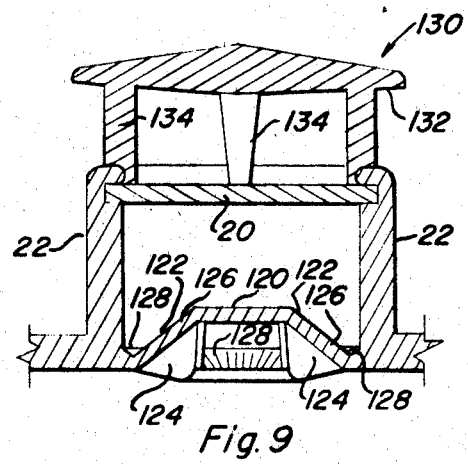
FIGS. 9 and 10 are cross sectional views, taken along sections perpendicular to each other, of another embodiment of the invention.
Figure 10:
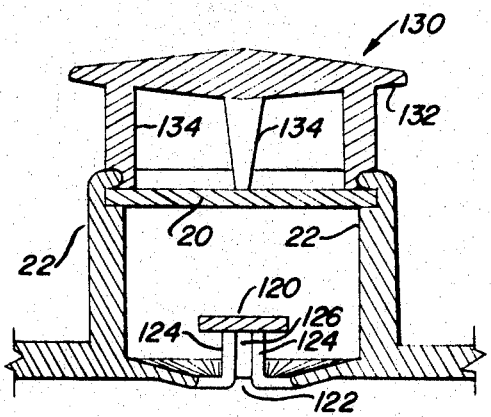

In the embodiment of the vent shown in FIGS. 9 and 10 a relatively small, flat baffle 120 is supported by two opposed supporting arms 122, each including two parallel vertical walls 124 and a sloping top wall 126. A sloping, circumferentially disposed wall 128 is provided around the interior of the entire vent and joins both the vertical walls 124 and the bottom of the sloping walls 126.

In this embodiment the entire space between the two arms 122 and the baffle 120 serves as both a gas vent and liquid return. Again the lower portion of this space provides the primary liquid return passage while the top portion provides the primary gas venting function. The major portion of the space provides other than a straight line path between the battery interior and the disc 20.

Also illustrated in FIGS. 9 and 10 is a dust cover 130 which is advantageously employed with the present vent. The cover, while illustrated with the embodiment of FIGS. 9 and 10, may be used with any of the vents previously described. The cover, of course, does not have to be used with the vent. The cover includes a conically shaped under surface 132 to avoid entrapment of gases. Four supporting legs 134 project from the surface 132 and may be secured to the cylindrical portion 22 by spin welding.

While the invention has been described with respect to certain preferred embodiments it should be noted that the invention is not limited thereto. The scope of the invention is defined by the following claims.

I claim:

1. In a battery including a cover portion, a vent comprising a microporous disc mounted in said cover portion, a secondary vent positioned in a space between said disc and the interior of said battery, said secondary vent including a baffle which includes a surface between said microporous disc and the interior of said battery, means for supporting said surface and for defining at least two passageways each having an opening near said surface and an opening near the lowest portion of said supporting means, said vent further including a circumferentially disposed surface between the baffle and the battery interior, said circumferentially disposed surface slanting toward said battery interior from the edge of the vent and wherein at least one passageway is provided in said slanting surface to enable the free passage of gas through the vent to prevent gas entrapment.

2. In a battery, the vent of claim 1 wherein said surface is disposed in an essentially horizontal plane.

References Cited

UNITED STATES PATENTS

| 767,554 | 8/1904 | Edison | 136—179.1 |
| 2,858,354 | 10/1958 | Dickover | 136—179 |
| 3,033,911 | 5/1962 | Duddy | 136—177 |
| 3,083,254 | 3/1963 | Slautterback | 136—177 |

FOREIGN PATENTS

| 70,210 | 3/1959 | France. |
| | | (First addition of Patent No. 1,078,964) |
| 777,724 | 6/1957 | Great Britain. |
| 877,785 | 4/1953 | Germany. |

WINSTON A. DOUGLAS, Primary Examiner

D. L. WALTON, Assistant Examiner

U.S. Cl. X.R.

136—170, 179